United States Patent [19]
West

[11] Patent Number: 5,414,855
[45] Date of Patent: May 9, 1995

[54] LANGUAGE COMPILER

[75] Inventor: William West, Gaertringen, Germany

[73] Assignee: International Business Machines Corporation, Armonk, N.Y.

[21] Appl. No.: 104,966

[22] Filed: Aug. 10, 1993

[30] Foreign Application Priority Data

Aug. 12, 1992 [EP] European Pat. Off. ........... 92113739

[51] Int. Cl.⁶ .............................................. G06F 9/45
[52] U.S. Cl. .............................. 395/700; 364/DIG. 1; 364/280.4
[58] Field of Search ......................... 395/700; 364/DIG. 1 MS File

[56] References Cited

U.S. PATENT DOCUMENTS

| | | | |
|---|---|---|---|
| 4,330,822 | 5/1982 | Dodson | 364/DIG. 1 |
| 5,230,049 | 7/1993 | Chang et al. | 395/700 |
| 5,230,050 | 7/1993 | Iitsuka et al. | 395/700 |

FOREIGN PATENT DOCUMENTS

| | | | |
|---|---|---|---|
| 58-022453 | 4/1983 | Japan | G06F 9/44 |
| 9003610 | 4/1990 | WIPO | G06F 9/45 |

OTHER PUBLICATIONS

"Dynamic Compilation in the Unix Environment", Software Practice & Experience, No. 7, M. K. Crowe, Jul. 1987, pp. 455–467.

"Unix Kernel Metrics", VMEbus in Research, 1988, C. Eck and C. Parkman, pp. 319–323.

Primary Examiner—Thomas M. Heckler
Attorney, Agent, or Firm—Arthur J. Samodovitz

[57] ABSTRACT

A method for improving the compilation of computer code is described. In the described invention, a storage array is created into which a set of code statements are temporarily placed before compilation. Such set of code statements include statements which require other parts of the code to be compiled before they can be compiled or are parts of the code which are not directly related to the running of the computer program, e.g. trace point descriptors. The code statements are later retrieved from the storage array, compiled in a language compiler and inserted into the correct position within the compiled computer code.

24 Claims, 2 Drawing Sheets

LANGUAGE COMPILER

FIELD OF THE INVENTION

The invention relates to a method for compiling computer code.

BACKGROUND OF THE INVENTION

A computer can understand and interpret only machine language which is in binary form and thus very difficult to write. Assembler language is a symbolic programming language that allows the programmer to code instructions instead of coding directly in machine language. Because the assembler language allows the programmer to use meaningful symbols made up of alphabetic and numeric characters instead of merely the binary digits 0 and 1 used in machine language, it can make coding easier to read, understand and change.

FIG. 1 shows an overview of a computer system. A programmer enters code in assembler language at a terminal 20 which is the stored in a source file 30 in memory. When the source file 30 is completed it is processed by an assembler 40 which produces an object module 50 in machine language. The object code in the object module 50 is used as an input to another processing program, the linkage editor 60, which in turn produces a load module 70. The load module 70 can be loaded into main storage 80 of a computer, which then executes the program.

The assembler language is the symbolic programming language that lies closest to the machine language in form and content. It is made up of statements that represent instructions and/or comments. The instruction statements are the working part of the language and are divided into the following three groups:

1) Machine Instructions. These are symbolic representations of machine languages instructions of the processor instruction set.

2) Assembler Instructions. These are requests to the assembler program to perform certain operations during the assembly of a source module. Examples of such operations are defining data constants, defining the end of a source module or reserving main storage areas. Except for instructions that define constants, the assembler does not translate assembler instructions into object code.

3) Macro Instructions. These are requests to the assembler program to process a predefined sequence of code called a macro definition in a "pre-compile" step. The macro definition may contain variables and occurs once at the beginning of the source code. The macro must be invoked by a "macro call" which may set the value of macro variables following the definition. From the macro definition, the assembler generates machine and assembler instructions which it then processes as if they were part of the original input in the source module. Macro definitions can be programmed by the user or may be pre-programmed into the assembler.

A description of the IBM/370 Assembler Language is found in the IBM Manual GC33-4010, entitled "OS/VS-DOS/VSE-VM/370 Assembler Language" and in the book "Principles of Assembler Language Programming for the IBM 370" by Spotswood D. Stoddard, McGraw Hill, Inc., New York, 1985. The description of the/370 Assembler language from these publications is incorporated herein by reference.

When compiling computer code, the assembler uses a base register and usually one or more "work" registers. The base register in IBM/370 or IBM/390 architecture can address a range of 4096 bytes. Whilst this is generally sufficient for compilation purposes, it can at times become overloaded. On example of such overloading is when code allowing the diagnosis of software errors (called trace points) needs to be incorporated into the main program code. Incorporating the trace point descriptors occupies valuable computer program main storage in the code and in some cases it would not be possible to introduce the descriptors since the base register would not have room for the extra storage required.

One way of solving this problem is by changing the sequence of language statements produced by a language compiler compared to the actual sequence of code generation.

Changing the sequence of language statements can be done for example by causing compiled language code to appear earlier in a program. Such a technique would be used to overlay already existing code data with new data and uses the ORG Assembler Language Control statement. This statement can also be used when, for example, at the time that a main storage location is generated in a program, the actual data to be stored there is not known until some later time when the compiler program generation has proceeded to some new location—one can then cause the compiler to overlay the past location with the final value which is now known. An example of such a program is:

| LABEL1 | DC | F'0' | PLACE HOLDER, TO BE OVERLAYED LATER |
| --- | --- | --- | --- |
| LABEL2 | EQU | * | LABEL2 LOCATION |
|  | ORG | LABEL1 | CHANGE PRESENT ORIGIN TO LABEL1 |
|  | DC | F'5' | LABEL1 NOW CONTAINS VALUE '5' |
|  | ORG |  | RETURN TO LABEL2 LOCATION |

In this example, the first statement reserves space for a variable LABEL1. Only later in the program is the value of this variable known. Using the ORG and DC statements, one can overlay the reserved space with the value 5. This value is then used during execution for any statements which use the value of variable LABEL1.

The ORG statement also has the advantage that one main storage location can be referenced with a given label (label "a") at the time of language compiling, and later another label (label "b") can be generated and caused to overlay the same location as label "a", thereby causing the same main storage location to be able to be referenced by two different labels ("a" and "b").

Another example of changing the sequence of language statements is when one wishes to cause language code to appear later in a program. This technique uses the LTORG statement to enable the programmer to create and refer to needed data constants in the program that do not yet exist. The statement is used to generate data constants (referred to as "literals", see Stottard p.30) that one would have to generate at some accessible location to the program and create some label for each on one and collect the data constants (called the "literal pool") at some place in main storage (see Stottard p.43). As an example, without the LTORG statement one might program:

|       |     |              |                                      |
|-------|-----|--------------|--------------------------------------|
|       | L   | REG1,DATAX   | LOAD REGISTER 1 WITH ADDRESS OF LABELZ |
|       | S   | REG1,DATAY   | SUBTRACT 8 FROM REGISTER 1 CONTENTS  |
| DATAX | DC  | A(LABELZ)    | ADDRESS OF LABEL LABELZ              |
| DATAY | DC  | F'08'        | DATA VALUE OF 8                      |

But using the LTORG statement one might program:

|       |                 |                                        |
|-------|-----------------|----------------------------------------|
| L     | REG1,=A(LABELZ) | LOAD REGISTER 1 WITH ADDRESS OF LABELZ |
| S     | REG1,=F'08'     | SUBTRACT 8 FROM REGISTER 1 CONTENTS    |
| LTORG |                 |                                        |

The LTORG statement when compiled will effectively create the following statements without any effort by the programmer:

|    |           |
|----|-----------|
| DC | A(LABELZ) |
| DC | F'08'     |

There are several disadvantages with using the LTORG statement. Firstly, the final order of the data within the program can be different from the order intended by the programmer, since the compiler may try to optimize the computer main storage required (e.g. the compiler will juggle the data so that they fit nicely aligned into 4 or 8 byte blocks without wasting space). For example, one codes:

|       |              |
|-------|--------------|
| MVC   | LAB1,=CL3'ABC' |
| L     | REG1,=A(LABELZ) |
| MVI   | LAB2,=CL1'X' |
| LTORG |              | but the LTORG statement when compiled will effectively create the following statements:

|    |           |
|----|-----------|
| DC | A(LABELZ) |
| DC | CL3'ABC'  |
| DC | CL1'X'    |

From this example, it can be seen that the order of the data has been altered from that order in which the data appear within the program. This is a serious limitation to the generalized usage of the LTORG statement.

The second disadvantage to the LTORG statement is that the data constants can not be manipulated by the program, i.e. they are "read-only" (see Stottard, p.114). Finally the third disadvantage to the LTORG statement is that only special parts of the language can be used as a "literal", the assumption being that these parts are to be used to generate data definitions, e.g. one cannot move statements forward that contain the ORG statement.

In principle, the ORG statement might also be used to cause language code to appear forward in a program. However in practice this does not occur for several reasons. Firstly, it is difficult generally to implement, so its use is discouraged and secondly there are theoretical limitations to the implementation as shown by the following example:

| LABELA | DS  | 0H              | LABEL A                                                         |
|--------|-----|-----------------|-----------------------------------------------------------------|
|        | ORG | LABELB          | RESET LOCATION COUNTER TO LABEL B                               |
| LABELC | DS  | 2XL(LABELB-LABELA) | DATA AREA, LENGTH DEPENDING ON THE DIFFERENCE BETWEEN LOCATIONS OF LABELS B AND A. |
| LABELB | DS  | 0H              | LABEL B                                                         |

Here the Language Compiler is unable to figure out what to do because it can not calculate a location of LABELB without knowing the length of LABELC whose length depends in turn on the location of LABELB.

An object of the present invention is to provide a method for compiling computer code which overcomes the above disadvantages.

SUMMARY OF THE INVENTION

This object is solved by providing a macro definition which defines archive storage, pre-compiles and archives a first portion of the computer code into a code deposit in the archive storage, compiles in a language compiler a second portion of the computer code to form compiled computer code in the base register range, retrieves from said code deposit said pre-compiled first portion of said computer code and inserts in said compiled computer code said pre-compiled first portion at the required location.

The deposit is created by defining an assembler storage array of sufficient size to hold said portion of the pre-compiled code. In one embodiment of the invention the said step of placing a portion of said pre-compiled code into said deposit is carried out by calling a macro.

In another embodiment of the invention, the deposit is created by inserting statements of said pre-compiled code into a scaffolding comprising non unique statements of computer code and placing the unique statements of said computer code and said scaffolding into the code deposit.

In the preferred embodiment of the invention, the computer code placed into the code deposit comprises trace point descriptors. These trace point descriptors are, in the preferred embodiment, between 62 and 4096 bytes in length. In addition to the pre-compiled computer code placed into the deposit, a fixed length of computer code, comprising 46 bytes, is maintained in the base register range. This means that the computer code compiled in the base register range can have a maximum number of trace points equal to 4096/46=89. Without the invention the base register could only compile code with between 4096/(46+62)=37 and 4096/(46+4096)=0 trace points.

DETAILED DESCRIPTION OF THE INVENTION

Figure 1:
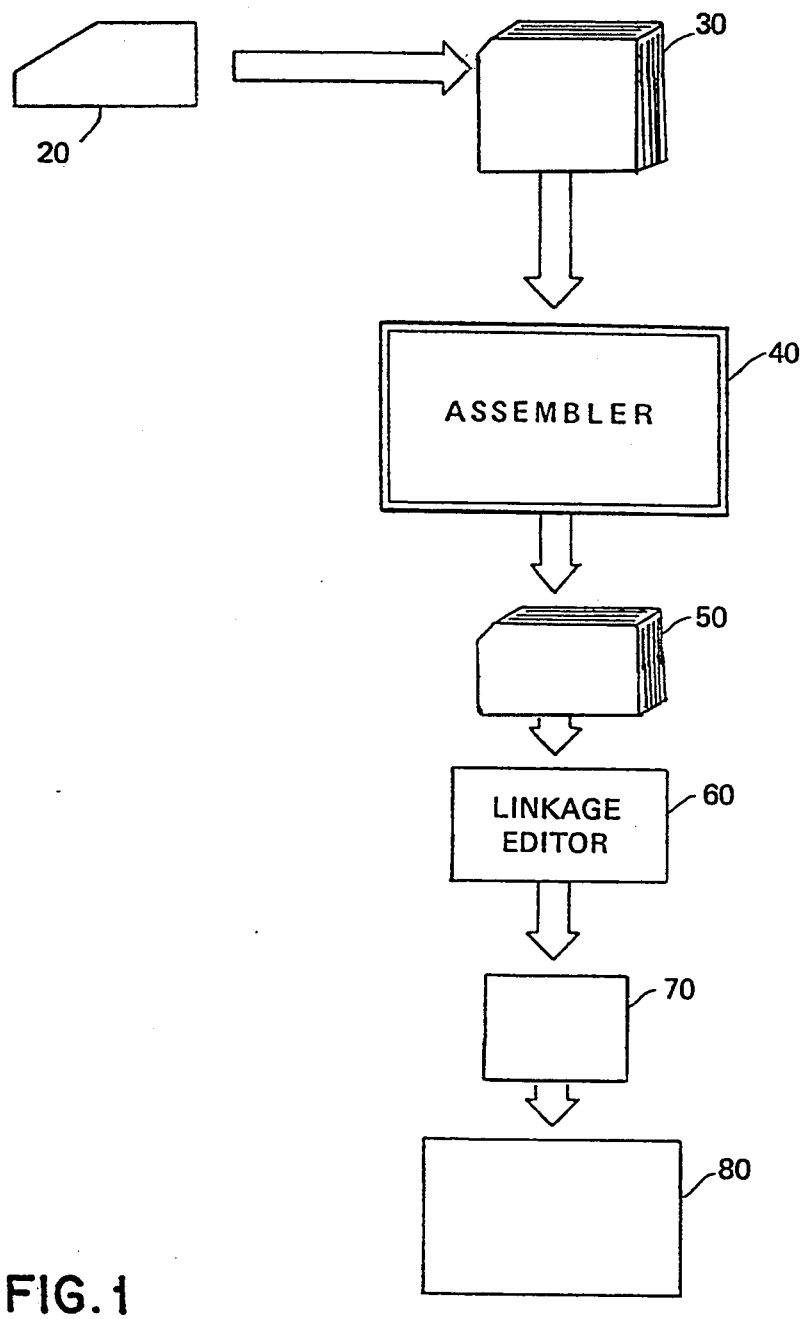
FIG. 1 shows an overview of a computer system with assembler.
Figure 2:
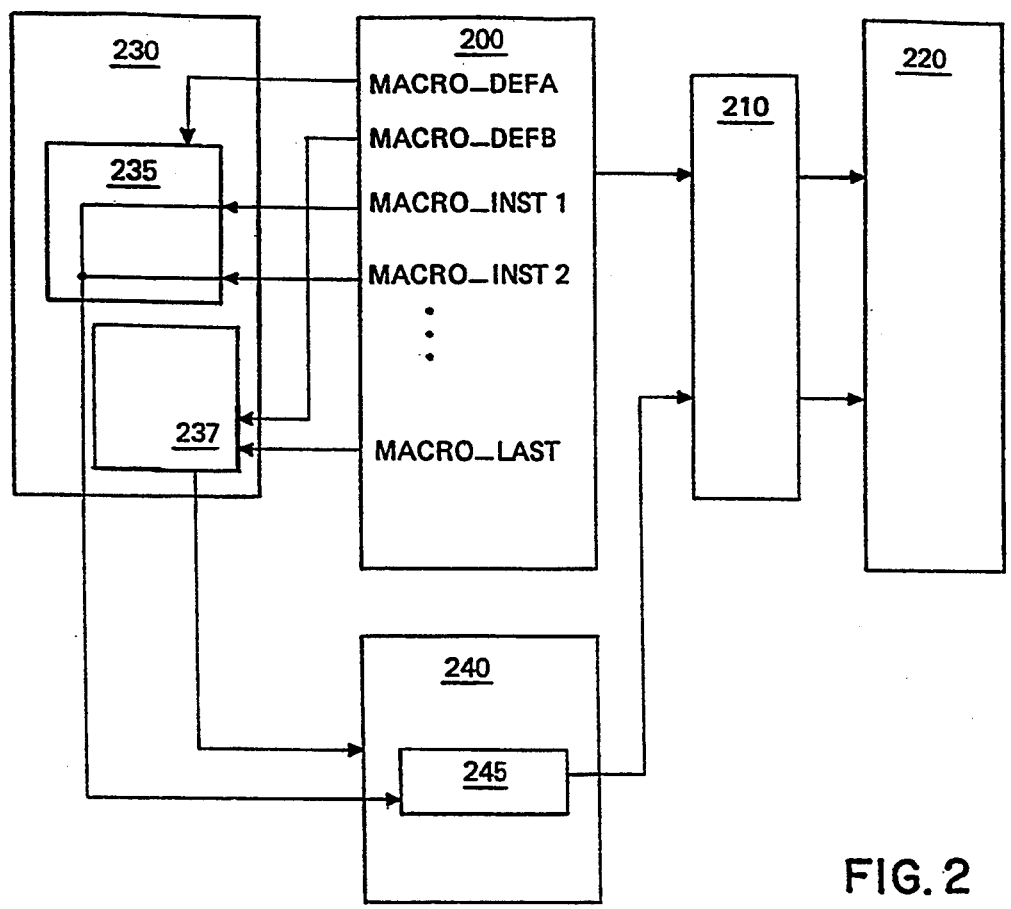
FIG. 2 shows an overview of the assembler according to the current invention.

An overview of the assembler according to the current invention is shown in FIG. 2. The source code in assembler language is shown as source module 200. This code incorporates two type of macro instructions which make use of the invention and are shown in the source module 200. The macro instructions are defined by the macro definitions MACRO_DEFA and MACRO_DEFB. They are called by the macro instructions MACRO_INST1 or MACRO_INST2 and MACRO_LAST respectively. These instructions are merely illustrative and other instructions could equally be well used. Block 210 represents the language compiler which compiles the source code from a source module 200 and outputs it as object code into an object module 220.

Block 230 represents the macro facility supplied by the assembler language compiler. Full details of the macro facility are supplied in part IV, pages 237–376, of the IBM Book GC33-4010-5 as referenced above. The macro facility 230 allows the programmer to write a macro instruction in the source module 200 which then tells the assembler 40 to process a particular macro definition. The instructions MACRO_INST1, MACRO_INST2 and MACRO_LAST are three examples of macro instructions which use a macro definition. Macro instructions MACRO_INST1 and MACRO_INST2 use the macro definition MACRO_DEFA. Macro instruction MACRO_LAST uses the definition MACRO_DEFB. The assembler 40 produces assembler language statements from these macro definitions every time the macro instructions call the macros defined by the macro definitions. Within the block 230 representing the macro facility, two sub blocks 235 and 237 are shown which represent macro definitions MACRO_DEFA and MACRO_DEFB respectively.

Block 240 represents archive storage which can be used to temporarily store parts of code and variables by the language compiler 210. Within the block 240 representing the working storage is shown a sub block 245 which represents an assembler storage array. The macro facility 230 allows the programmer to define for use during compilation of a source module 200 "storage array" tables for text statements. The tables vary in size depending on the capabilities of the language compiler. In the implementation of the invention, the table may contain between 4096 and 32768 entries. Each entry is able to hold text statements of between 1 and 256 characters.

Figure 3:
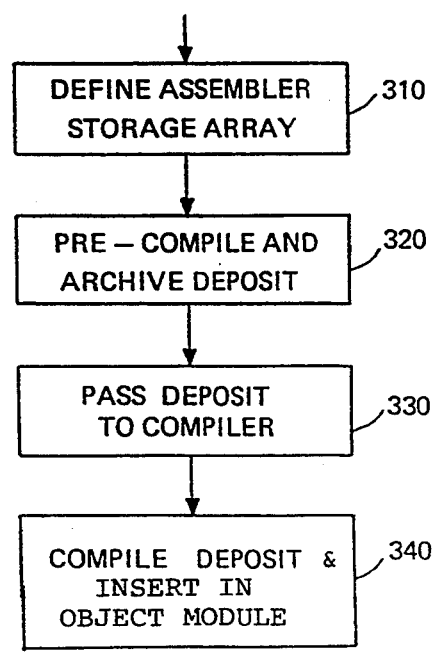
FIG. 3 shows a block diagram outlining the steps of the invention.

The method in which the invention is implemented is shown in FIG. 3. In block 310, the programmer firstly defines at the beginning of his program in the working storage 240 an assembler storage array 245 of adequate size to hold the code "deposit" or "deposits". The maximum size of the deposit is determined by the compiler as mentioned earlier. For example it could be 1000 entries. In the source module 200 the following statement will appear:

GLBC&DEPOS (1000)

GBLC is a macro command in/370 assembler language which is contained in both macro definitions MACRO_DEFA and MACRO_DEFB in the macro compiler 230. It is called by the first macro instruction MACRO_INST1 defined by MACRO_DEFA and is referred to by subsequent calls of the macro instructions defined by MACRO_DEFA (i.e. MACRO_INST2 in our example). It is also called by the macro instruction MACRO_LAST. GLBC creates a character array 245 in the archive storage 240. In this example a character array 245 named &DEPOS is created with a maximum of 1000 entries.

At the point within the source module 200 where the code "deposit" is to be created, the programmer inserts a macro instruction call which pre-compiles and archives each code deposit statement to an entry within the assembler storage array 245 (block 320) by writing the following series of statements:

| &DEPOS(1) | SETC 'CODE STATEMENT 1' | 1ST DEPOSIT STATEMENT |
|---|---|---|
| &DEPOS(2) | SETC 'CODE STATEMENT 2' | 2ND DEPOSIT STATEMENT |
| ---- | | |
| &DEPOS(X) | SETC 'CODE STATEMENT X' | X DEPOSIT STATEMENT |
| ---- | | |
| &DEPOS(nnn) (nnn<1000) | SETC 'CODE STATEMENT nnn' | nnn DEPOSIT STATEMENT |

Each of the instructions SETC is a macro instruction whose variable content is 'code statement x'. The series of SETC instructions is represented by the macro instruction MACRO_INST1 in the source module 200 in FIG. 2. The macro instruction MACRO_INST1 calls the macro defined by the macro definition MAC_DEFA to pre-compile and archive the various code statements, represented by 'CODE STATEMENT 1' etc, as entries &DEPOS(1) etc., into the created assembler storage array 245.

In the example illustrated a second code deposit is created by the macro instruction MACRO_INST2. This also comprises a series of statements.

| &&DEPOS(nnn+1) | SETC 'CODE STATEMENT nnn+1' | nnn+1 DEPOSIT STATEMENT |
|---|---|---|
| &&DEPOS(nnn+2) | SETC 'CODE STATEMENT nnn+2' | nnn+2 DEPOSIT STATEMENT |

| | | |
|---|---|---|
| &&DEPOS(nnn+mmm)<br>(nnn+mmm)≦1000 | SETC 'CODE STATEMENT nnn+mmm' | nnn+mmm DEPOSIT STATEMENT |

The second code deposit is stored in the created assembler storage array 245 at locations immediately following the location occupied by the first code deposit.

Later in the program when the programmer decides that he wishes to pass the code deposit to the language compiler (block 330), another macro is called by the macro instruction MACRO_LAST in the source module 200. The called macro is defined by the second macro definition 237 MACRO_DEFB in the macro facility 230. The macro instruction MACRO_LAST causes the contents of the entries in the assembler storage array 245 to be passed to the language compiler 210:

```
&DEPOS(1)
&DEPOS(2)
------
&DEPOS(nnn)
&DEPOS(nnn+1)
&DEPOS(nnn+2)
------
&DEPOS(nnn+mmm)
```

The code statements in these entries are then compiled and placed in the object module 220 (block 340) at the required places in the object code. The code statements placed in the code deposit can of course refer to variables and labels which were first defined before, during or after the code had been placed into the deposit 245.

It is also possible to use the macro facility 230 to generate code in other ways. Suppose, for example, that the object module 220 contains sections of code generated from source code which had the same basic structure but in which only part of the statement was unique. An example of such a structure would be the following series of code statements:

| | DC | A(LABELY) | ADDRESS OF LABELY |
|---|---|---|---|
| | DC | F'100' | CONSTANT DECIMAL 100 |
| LABELY | DC | CL4'XXXX' | CHARACTERS "XXXX" |

This series of code statements appears repeatedly throughout the program with different labels and different variables. The assembler instruction DC remains in the same place throughout the repeated series of code statements (i.e. is "non-unique"). The macro definition MACRO_DEFA 235 is then defined to contain a "scaffolding" which comprises the non-unique portions of the code statements:

| | DC &DEPOS(x) |
|---|---|
| | DC &DEPOS(x+1) |
| &DEPOS(x+2) | DC &DEPOS(x+3) |

The macro definition MACRO_DEFA 235 also comprises a series of SETC instructions to indicate that the variables &VAR0, &VAR1 etc. given when the macro instruction is called are placed in the corresponding locations in the assembler storage array 245:

| &DEPOS(x) | SETC '&VAR0' |
|---|---|
| &DEPOS(x+1) | SETC '&VAR1' |
| &DEPOS(x+2) | SETC '&VAR2' |
| &DEPOS(x+3) | SETC 'VAR3' |

When the macro is called, e.g. by the macro instruction MACRO_INST1, the values of the variable &VAR0 etc. are given:

| &VAR0 = 'A(LABELY)' |
|---|
| &VAR1 = 'F"100"' |
| &VAR2 = 'LABELY' |
| &VAR3 = 'CL4'xxxx'' |

The effect of calling the macro defined by MACRO_DEFA is therefore to store in the assembler storage array the following statement:

| &DEPOS(1) SETC 'A(LABELY)' | 1ST DEPOSIT STATEMENT PART |
|---|---|
| &DEPOS(2) SETC 'F"100"' | 2ND DEPOSIT STATEMENT PART |
| &DEPOS(3) SETC 'LABELY' | 3ND DEPOSIT STATEMENT PART |
| &DEPOS(4) SETC 'CL4"XXXX"' | 4ND DEPOSIT STATEMENT PART |

The macro defined by the second macro definition 237 MACRO_DEFB is then called later by the source module 200 using the macro instruction MACRO_LAST. The called macro uses the statements in the assembler storage array 245 together with the scaffolding given by MACRO_DEFA to produce following source code which is then passed to the language compiler 210:

| DC | A(LABELY) | | |
|---|---|---|---|
| DC | F'100' LABELY | DC | CL4'XXXX' |

In one particular embodiment of the invention, the code placed into the deposit 245 is code used for tracing routines, known as trace point descriptions. These trace point descriptions do not contribute to the actual operation carried out by the computer program, but are used by some diagnostic programs to trace errors in the computer program when it is running. By placing the tracing code into deposits 245, more space is found in the base register range for the computer program source code which is to be compiled.

An example will serve to illustrate the advantages of doing this. The implementation of the invention split the trace point description into two parts, one of which was placed within the base register range, and the other of which was placed into the code deposit stored beyond the base register range and referenced by use of a work register. Calling the macro defined by the macro definition MACRO_DEFA will produce two parts for the trace point description. The first part of the trace point description is stored in the base register range and is fixed in size to 46 bytes. The second part of the trace point description is variable in size, in the current implementation from 62 to 462 bytes, in future implementations up to 4096 bytes.

Thus within one base register, there can be a maximum of 4096/46=89 trace points, as opposed to 4096/(46+462)=8 trace points. In future implementations of the tracing routines, it would not be possible to have incorporated all the code relating to one trace point description within one base register.

Based on the foregoing, a system and method for compiling computer code have been disclosed. However, numerous modifications and substitutions can be made without deviating from the scope of the present invention. Therefore, the present invention has been disclosed by way of illustration and not limitation and reference should be made to the following claims to determine the scope of the present invention.

I claim:

1. Method of compiling computer coder said method comprising the computer implemented steps of:
   defining an archive region in storage;
   pre-compiling a first portion of said computer code and archiving the pre-compiled first portion into a code deposit in said archive region;
   compiling in a language compiler a second portion of said computer code and storing the compiled second portion;
   transferring said pre-compiled first portion from said archive region to the language compiler;
   compiling in the language compiler said pre-compiled first portion; and
   inserting in said compiled second portion the compiled, pre-compiled first portion at a location at which said compiled, pre-compiled first portion functionally cooperates with said compiled second portion.

2. Method according to claim 1 wherein said archiving step comprises the step of defining an array of sufficient size to hold said pre-compiled first portion.

3. Method according to claim 1 wherein said step of pre-compiling said first portion of said computer code and archiving said pre-compiled first portion into said code deposit comprises the step of calling a macro.

4. Method according to claim 1 further comprising the step of pre-compiling a third portion of said computer code and archiving the pre-compiled third portion into another code deposit in said archive region.

5. Method according to claim 1 further comprising the step of defining and storing non-unique code statements as a macro; and
   wherein the step of pre-compiling and archiving said pre-compiled first portion comprises the steps of
   calling said macro, said call including unique data for inclusion in said macro;
   inserting said unique data into said [scaffolding macro; and
   archiving the macro including the inserted unique data into said code deposit.

6. Method according to claim 5 wherein said macro also includes instructions which indicate that said data should be stored in particular locations in said code deposit.

7. Method according to claim 1 wherein said pre-compiled first portion archived into said code deposit is a trace point descriptor.

8. Method according to claim 7 wherein associated with each trace point descriptor is a second portion of compiled code which is not stored in the deposit.

9. Method according to claim 7 wherein said second portion of computer code is 46 bytes in length.

10. A computer system for compiling computer code, said system comprising:
    means for defining an archive region in storage;
    means for pre-compiling a first portion of said computer code and archiving the pre-compiled first portion into a code deposit in said archive region;
    means for compiling in a language compiler a second portion of said computer code and storing the compiled second portion;
    means for transferring said pre-compiled first portion from said archive region to the language compiler;
    means for compiling in the language compiler said pre-compiled first portion; and
    means for inserting in said compiled second portion the compiled, pre-compiled first portion at a location at which said compiled, pre-compiled first portion functionally cooperates with said compiled second portion.

11. System according to claim 10 wherein said means for archiving comprises means for defining an array of sufficient size to hold said pre-compiled first portion.

12. System according to claim 10 wherein said means for pre-compiling said first portion of said computer code and archiving said pre-compiled first portion into said code deposit comprises means for calling a macro.

13. System according to claim 10 further comprising means for pre-compiling a third portion of said computer code and archiving the pre-compiled third portion into another code deposit in said archive region.

14. System according to claim 10 further comprising means for defining and storing non-unique code statements as a macro; and
    wherein the means for pre-compiling and archiving said pre-compiled first portion comprises;
    means for calling said macro, said call including unique data for inclusion in said macro;
    means for inserting said unique data into said macro; and
    means for archiving the macro including the inserted unique data into said code deposit.

15. System according to claim 14 wherein said macro also includes instructions which indicate that said data should be stored in particular locations in said code deposit.

16. System according to claim 10 wherein said pre-compiled first portion of said computer code archived into said code deposit is a trace point descriptor.

17. System according to claim 16 wherein associated with each trace point descriptor is a second portion of compiled code which is not stored in the deposit.

18. System according to claim 16 wherein said second portion of computer code is 46 bytes in length.

19. A method of compiling computer code, said method comprising the following computer implemented steps in order:
    pre-compiling a first portion of said computer code and storing the pre-compiled first portion;
    compiling a second portion of said computer code in a compiler and storing the compiled second portion in an object module;
    transferring to said compiler and compiling said pre-compiled first portion; and inserting the compiled, pre-compiled first portion within said object module such that said compiled, pre-compiled first portion functionally cooperates with said compiled second portion.

20. A method according to claim 19 wherein said step of pre-compiling said first portion of said computer code comprises the step of calling a macro.

21. A method according to claim 20 wherein said step of pre-compiling said first portion of said computer code further comprises the step of generating machine and assembler instructions corresponding to said macro.

22. A method according to claim 19 wherein said step of pre-compiling said first portion of said computer code comprises the steps of defining a macro and then calling said macro.

23. A method according to claim 22 wherein said step of storing said pre-compiled first portion comprises the step of calling another macro to store said pre-compiled first portion.

24. A method according to claim 19 wherein said compiled, pre-compiled first portion is inserted within said compiled second portion.

* * * * *